US012618993B2

(12) United States Patent (10) Patent No.: US 12,618,993 B2
Emura et al. (45) Date of Patent: May 5, 2026

(54) RELAYING APPARATUS INCLUDING A FIBER SENSING SYSTEM FOR SUBMARINE USE

(71) Applicant: NEC Corporation, Tokyo (JP)

(72) Inventors: Masafumi Emura, Tokyo (JP); Yuta Sawai, Tokyo (JP); Hiroki Tanaka, Tokyo (JP); Minoru Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 300 days.

(21) Appl. No.: 18/484,894

(22) Filed: Oct. 11, 2023

(65) Prior Publication Data

US 2024/0134077 A1    Apr. 25, 2024
US 2024/0230936 A9    Jul. 11, 2024

(30) Foreign Application Priority Data

Oct. 21, 2022    (JP) ................................. 2022-169207

(51) Int. Cl.
  G01V 1/00      (2024.01)
  G01V 1/22      (2006.01)
  G01V 1/38      (2006.01)
(52) U.S. Cl.
  CPC .............. G01V 1/226 (2013.01); G01V 1/001 (2013.01); G01V 1/3852 (2013.01)

(58) Field of Classification Search
  None
  See application file for complete search history.

(56) References Cited

U.S. PATENT DOCUMENTS 11,189,984 B2 *  11/2021  Nakamura ......... H04B 10/2916

FOREIGN PATENT DOCUMENTS

WO        2021/153142 A1    8/2021
WO    WO-2022044612 A1 *    3/2022   ......... G01D 3/35316

* cited by examiner

*Primary Examiner* — Eric S. McCall
*Assistant Examiner* — Nigel H Plumb

(57) ABSTRACT

A fiber sensing system according to the present disclosure includes a submarine cable, and a plurality of relaying apparatuses being connected in series to one another via the submarine cable. The relaying apparatus includes a DAS interrogator being connected to a relaying apparatus at a subsequent stage via a sensing optical fiber in the submarine cable, and a terminator being connected to a relaying apparatus at a preceding stage via the sensing optical fiber. The DAS interrogator outputs probe light to the sensing optical fiber. The terminator terminates probe light being output from the DAS interrogator in the relaying apparatus at the preceding stage to the sensing optical fiber. The DAS interrogator receives backscattered light of probe light from the sensing optical fiber, and acquires the DAS data from the received backscattered light.

10 Claims, 9 Drawing Sheets

| SECTION | GROUND STATION | RELAYING APPARATUS #1 | — | RELAYING APPARATUS #2 | — | RELAYING APPARATUS #3 | — | ⋯⋯⋯ | RELAYING APPARATUS #N |
|---|---|---|---|---|---|---|---|---|---|
| DATA NUMBER | | 0 | 1 | | 2 | | | ⋯⋯⋯ | |
| DATA ACQUISITION | | ☐ | ☑ | | ☑ | | | ⋯⋯⋯ | |

Fig. 5

RELAYING APPARATUS INCLUDING A FIBER SENSING SYSTEM FOR SUBMARINE USE

INCORPORATION BY REFERENCE

This application is based upon and claims the benefit of priority from Japanese patent application No. 2022-169207, filed on Oct. 21, 2022, the disclosure of which is incorporated herein in its entirety by reference.

TECHNICAL FIELD

The present disclosure relates to a fiber sensing system, a relaying apparatus, and a fiber sensing method.

BACKGROUND ART

In recent years, a fiber sensing system using a distributed acoustic sensing (DAS) interrogator that acquires environment information representing an environment of an optical fiber has been researched and developed. Specifically, the DAS interrogator receives backscattered light in an optical fiber, utilizes the received backscattered light, and thereby acquires, as the environment information, DAS data representing vibration (including sound, hereinafter the same) being applied to the optical fiber.

In addition, recently, since sensitivity of an optical fiber has been improved, research on practical application of a fiber sensing system using a DAS interrogator as an environment monitoring system for land use has been advanced.

In addition, research on applying a fiber sensing system using a DAS interrogator into the sea also has been advanced (e.g., International Patent Publication No. WO2021/153142). In this case, the DAS interrogator uses backscattered light in an optical fiber included in a submarine cable, and thereby acquires DAS data.

Herein, when a fiber sensing system using a DAS interrogator is applied into the sea, and a sound of an underwater organism, noise of marine traffic, and the like are monitored, monitoring can be performed with high accuracy by using a feature element existing in a higher frequency band.

However, due to a principle of fiber sensing, when the DAS interrogator lengthens a section of a submarine cable acquiring DAS data, there is a limitation that DAS data representing vibration in a high frequency band cannot be acquired. In addition, there is also a limitation on a location where the DAS interrogator is installed in the sea. Therefore, in a fiber sensing system according to the related art, there is a problem that a limitation exists on a frequency in DAS data that can be acquired in the sea.

SUMMARY

Thus, in view of the above-described problem, an example object of the present disclosure is to provide a fiber sensing system, a relaying apparatus, and a fiber sensing method that are capable of acquiring DAS data representing vibration in a high frequency band in the sea.

In a first example aspect, a fiber sensing system includes:

a submarine cable; and a plurality of relaying apparatuses configured to be connected in series to one another via the submarine cable, wherein the submarine cable includes a sensing optical fiber, each of the plurality of relaying apparatuses includes a distributed acoustic sensing (DAS) interrogator configured to be connected to a relaying apparatus at a subsequent stage via the sensing optical fiber, and a terminator configured to be connected to a relaying apparatus at a preceding stage via the sensing optical fiber, the DAS interrogator outputs probe light to the sensing optical fiber being connected to the relaying apparatus at the subsequent stage, the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

In a second example aspect, a relaying apparatus is one relaying apparatus of a plurality of relaying apparatuses being connected in series to one another via a submarine cable, and includes:

a distributed acoustic sensing (DAS) interrogator configured to be connected to a relaying apparatus at a subsequent stage via a sensing optical fiber included in the submarine cable; and a terminator configured to be connected to a relaying apparatus at a preceding stage via the sensing optical fiber, wherein the DAS interrogator outputs probe light to the sensing optical fiber being connected to the relaying apparatus at the subsequent stage, the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

In a third example aspect, a fiber sensing method is a fiber sensing method to be executed by one relaying apparatus of a plurality of relaying apparatuses being connected in series to one another via a submarine cable, wherein the relaying apparatus includes a distributed acoustic sensing (DAS) interrogator configured to be connected to a relaying apparatus at a subsequent stage via a sensing optical fiber included in the submarine cable, and a terminator configured to be connected to a relaying apparatus at a preceding stage via the sensing optical fiber, the fiber sensing method includes:

by the DAS interrogator, outputting probe light to the sensing optical fiber being connected to the relaying apparatus at the subsequent stage;

by the terminator, terminating probe light being output from the DAS interrogator in the relaying apparatus at the preceding stage to the sensing optical fiber being connected to the relaying apparatus at the preceding stage in such a way that the probe light is not reflected at an end portion of the sensing optical fiber; and by the DAS interrogator, receiving backscattered light of probe light from the sensing optical fiber being connected to the relaying apparatus at the subsequent stage, and acquiring, from the received backscattered light, DAS data representing vibration applied to the sensing optical fiber being connected to the relaying apparatus of the subsequent stage.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 5 is a diagram illustrating an example of a setting screen for setting an acquisition section of DAS data displayed on the information processing apparatus in the ground station according to the first example embodiment;

EXAMPLE EMBODIMENT

Hereinafter, example embodiments of the present disclosure will be described with reference to the drawings. Note that, the following description and the drawings are omitted and simplified as appropriate for clarity of description. In addition, in the following drawings, the same elements are denoted by the same reference signs, and redundant descriptions are omitted as necessary.

First Example Embodiment

Figure 1:
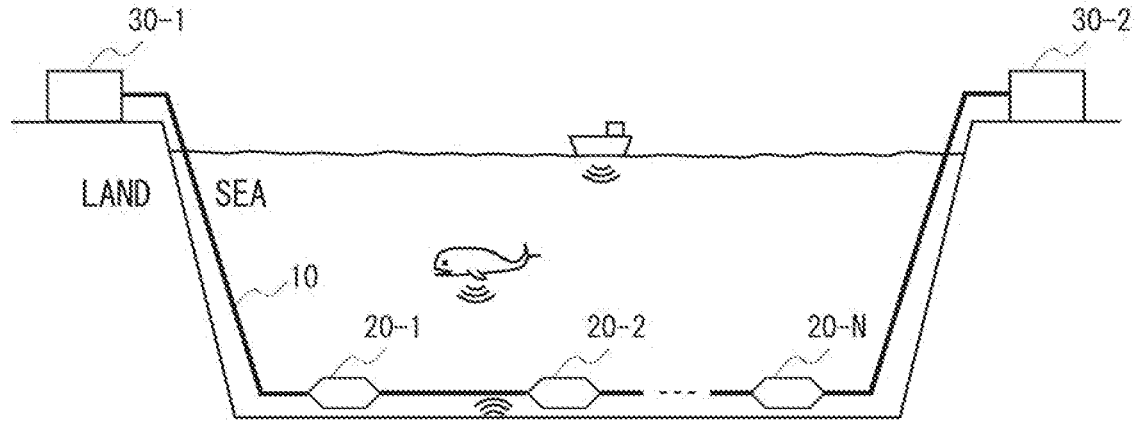
FIG. 1 is a diagram illustrating a configuration example of a fiber sensing system according to a first example embodiment.

FIG. 1 is a diagram illustrating a configuration example of a fiber sensing system according to a first example embodiment.

The fiber sensing system according to the first example embodiment includes a submarine cable 10, a plurality of optical amplification relaying apparatuses 20-1 to 20-N (N is a natural number equal to or greater than 2), and ground stations 30-1 and 30-2. Note that, in the following description, when it is not determined which of the optical amplification relaying apparatuses 20-1 to 20-N is, it is simply referred to as an "optical amplification relaying apparatus 20" as appropriate. Similarly, the ground stations 30-1 and 30-2 are simply referred to as a "ground station 30" as appropriate. In addition, in each of the following drawings, each of the optical amplification relaying apparatuses 20-1 to 20-N is appropriately denoted as optical amplification relaying apparatuses #1 to #N, respectively.

The submarine cable 10 and the optical amplification relaying apparatuses 20-1 to 20-N are installed in the sea, more specifically, in the seabed.

The optical amplification relaying apparatuses 20-1 to 20-N are connected in series to each other via the submarine cable 10. In addition, the optical amplification relaying apparatuses 20-1 to 20-N are installed at a regular interval of the submarine cable 10.

The ground station 30-1 is connected to one end of the submarine cable 10, and the ground station 30-2 is connected to the other end of the submarine cable 10.

The submarine cable 10 is a multi-core cable including a communication optical fiber, a sensing optical fiber, a power line, and the like, as described later.

As described later, the optical amplification relaying apparatuses 20-1 to 20-N are mounted with components for fiber sensing and components for communication according to fiber sensing, in addition to an optical amplifier being mounted on an optical amplification relaying apparatus according to the related art as well.

Figure 2:
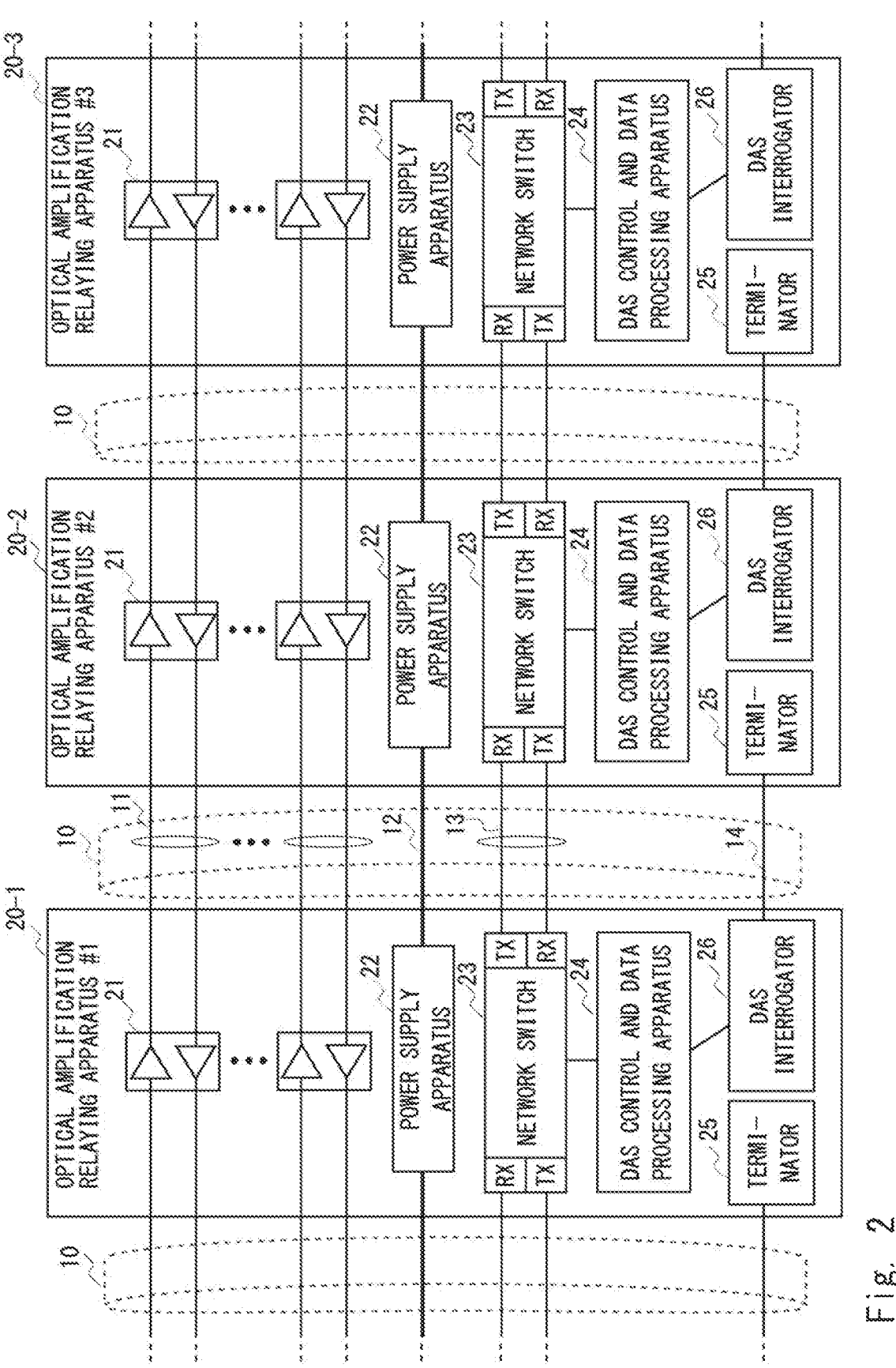
FIG. 2 is a diagram illustrating a configuration example of a submarine cable and an optical amplification relaying apparatus according to the first example embodiment.

FIG. 2 is a diagram illustrating a configuration example of the submarine cable 10 and the optical amplification relaying apparatuses 20-1 to 20-N according to the first example embodiment.

First, a configuration example of the submarine cable 10 will be described.

The submarine cable 10 is a multi-core cable as described above. The submarine cable 10 includes a communication optical fiber 11 used for communication between the ground stations 30-1 and 30-2, a power line 12 for supplying power, a communication optical fiber 13 used for communication according to fiber sensing among the ground stations 30-1 and 30-2, and the optical amplification relaying apparatuses 20-1 to 20-N, and a sensing optical fiber 14 used for fiber sensing.

As the sensing optical fiber 14, an optical fiber for optical communication similar to the communication optical fibers 11 and 13 can be used. In addition, the sensing optical fiber 14 can also use a fiber dedicated to fiber sensing in which sensitive is increased by adding impurities.

Next, a configuration example of the optical amplification relaying apparatuses 20-1 to 20-N will be described.

Although the configuration of the optical amplification relaying apparatus 20-2 will be described below, the other optical amplification relaying apparatuses 20-1, and 20-3 to 20-N have a similar configuration to the optical amplification relaying apparatus 20-2.

The optical amplification relaying apparatus 20-2 includes an optical amplifier 21, a power supply apparatus 22, a network switch 23, a DAS control and data processing apparatus 24, a terminator 25, and a DAS interrogator 26.

The optical amplifier 21 is connected to the communication optical fiber 11 in the submarine cable 10. The optical amplifier 21 amplifies a signal transmitted via the communication optical fiber 11.

The power supply apparatus 22 is connected to the power line 12 in the submarine cable 10. The power supply apparatus 22 supplies a power source to be supplied via the power line 12 to each component in the optical amplification relaying apparatus 20-2.

The network switch 23 is connected to the communication optical fiber 13 in the submarine cable 10. The network switch 23 transmits, via the communication optical fiber 13, DAS data (described later) acquired by the DAS interrogator 26 to the ground station 30-1 or 30-2. In addition, the network switch 23 receives, via the communication optical fiber 13, control information for controlling the DAS control and data processing apparatus 24 from the ground station 30-1 or 30-2, and outputs the received control information to the DAS control and data processing apparatus 24. Note that, when the number of optical amplification relaying apparatuses 20 installed in the fiber sensing system is large, the network switch 23 can increase an amount of communication such as DAS data by performing optical wavelength multiplex communication.

The DAS control and data processing unit 24 is connected to the network switch 23 and the DAS interrogator 26. The DAS control and data processing apparatus 24 controls the DAS interrogator 26, based on control information from the ground station 30-1 or 30-2. Specifically, the DAS control and data processing apparatus 24 controls the DAS interrogator 26 in such a way as to acquire DAS data when the control information notifies that the submarine cable between the optical amplification relaying apparatuses 20-2 and 20-3 is an acquisition section of the DAS data. At this time, the DAS control and data processing apparatus 24 controls an operating state of the DAS interrogator 26, and also performs generation of a reference clock necessary for an operation of the DAS interrogator 26, and the like. In addition, the DAS control and data processing apparatus 24 temporarily stores DAS data acquired by the DAS interrogator 26, and then outputs the stored DAS data to the network switch 23. Note that, the DAS control and data processing apparatus 24 can compress and encrypt DAS data as necessary, and then output the compressed and encrypted DAS data to the network switch 23.

The terminator 25 is connected to the sensing optical fiber 14 in the submarine cable 10. Specifically, the terminator 25 is connected to the DAS interrogator 26 in the optical amplification relaying apparatus 20-1 at a preceding stage via the sensing optical fiber 14. Herein, when the submarine cable 10 between the optical amplification relaying apparatuses 20-1 and 20-2 is an acquisition section of DAS data, probe light is output from the DAS interrogator 26 in the optical amplification relaying apparatus 20-1 at the preceding stage to the sensing optical fiber 14. In this case, the terminator 25 terminates probe light being output to the sensing optical fiber 14 in such a way that the probe light is not reflected at a fiber end of the sensing optical fiber 14.

The DAS interrogator 26 is connected to the sensing optical fiber 14 in the submarine cable 10. Specifically, the DAS interrogator 26 is connected to the terminator 25 in the optical amplification relaying apparatus 20-3 at a subsequent stage via the sensing optical fiber 14. Herein, when the submarine cable 10 between the optical amplification relaying apparatuses 20-2 and 20-3 is an acquisition section of DAS data, the DAS interrogator 26 outputs probe light to the sensing optical fiber 14, receives backscattered light of the probe light from the sensing optical fiber 14, and acquires, from the received backscattered light, DAS data representing vibration applied to the sensing optical fiber 14. In addition, the DAS interrogator 26 outputs the DAS data acquired from the backscattered light to the DAS control and data processing apparatus 24.

Note that, in the optical amplification relaying apparatus 20-1, the terminator 25 is connected to the ground station 30-1 via the sensing optical fiber 14 in the submarine cable 10.

In addition, in the optical amplification relaying apparatus 20-N, the DAS interrogator 26 is connected to the ground station 30-2 via the sensing optical fiber 14 in the submarine cable 10.

Figure 3:
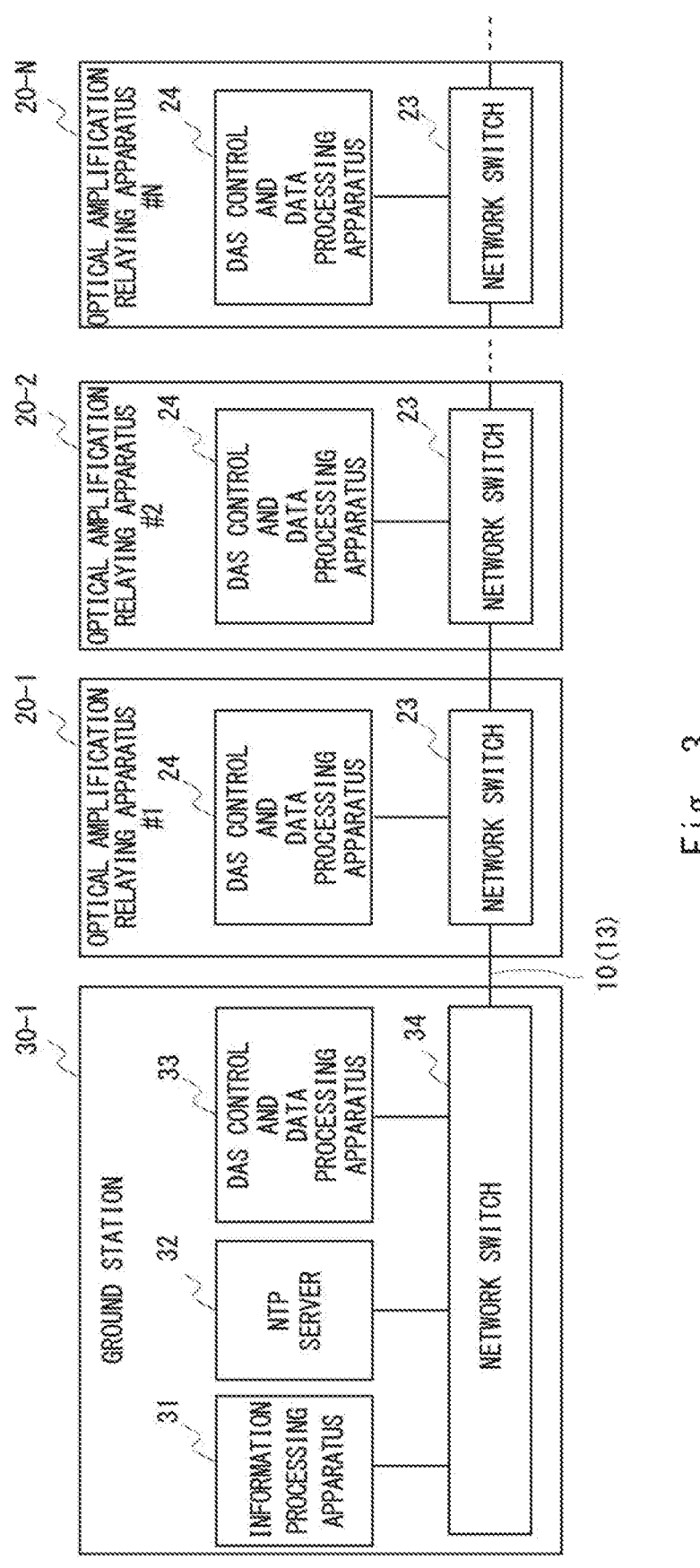
FIG. 3 is a diagram illustrating a configuration example of components used for communication according to fiber sensing in the fiber sensing system according to the first example embodiment.

FIG. 3 is a diagram illustrating a configuration example of components used for communication according to fiber sensing in the fiber sensing system according to the first example embodiment.

The optical amplification relaying apparatuses 20-1 to 20-N include the network switch 23 and the DAS control and data processing apparatus 24 as components used for communication according to fiber sensing. Note that, in FIG. 3, among the components of the optical amplification relaying apparatuses 20-1 to 20-N illustrated in FIG. 2, the other components are omitted.

Although a configuration of the ground station 30-1 will be described below, the ground station 30-2 has similar configuration to the ground station 30-1.

The ground station 30-1 includes an information processing apparatus 31, a network time protocol (NTP) server 32, a DAS control and data processing apparatus 33, and a network switch 34.

The information processing apparatus 31 generates control information for controlling the DAS control and data processing apparatus 33 in the ground station 30-1 and the DAS control and data processing apparatus 24 in the optical amplification relaying apparatuses 20-1 to 20-N. The control information is transmitted, via the network switch 34, to the DAS control and data processing apparatus 33 in the ground station 30-1 and the DAS control and data processing apparatus 24 in the optical amplification relaying apparatuses 20-1 to 20-N. In addition, the information processing apparatus 31 receives, via the network switch 34, DAS data temporarily stored in the DAS control and data processing apparatus 24 in the optical amplification relaying apparatuses 20-1 to 20-N, and performs signal processing and information processing on the received DAS data.

The NTP server 32 is a time server for performing time adjustment of the DAS control and data processing apparatus 33 in the ground station 30-1 and the DAS control and data processing apparatus 24 in the optical amplification relaying apparatuses 20-1 to 20-N.

The network switch 34 is connected to the communication optical fiber 13 in the submarine cable 10. Specifically, the network switch 34 is connected to each of the network switches 23 in the optical amplification relaying apparatuses 20-1 to 20-N via the communication optical fiber 13.

Figure 4:
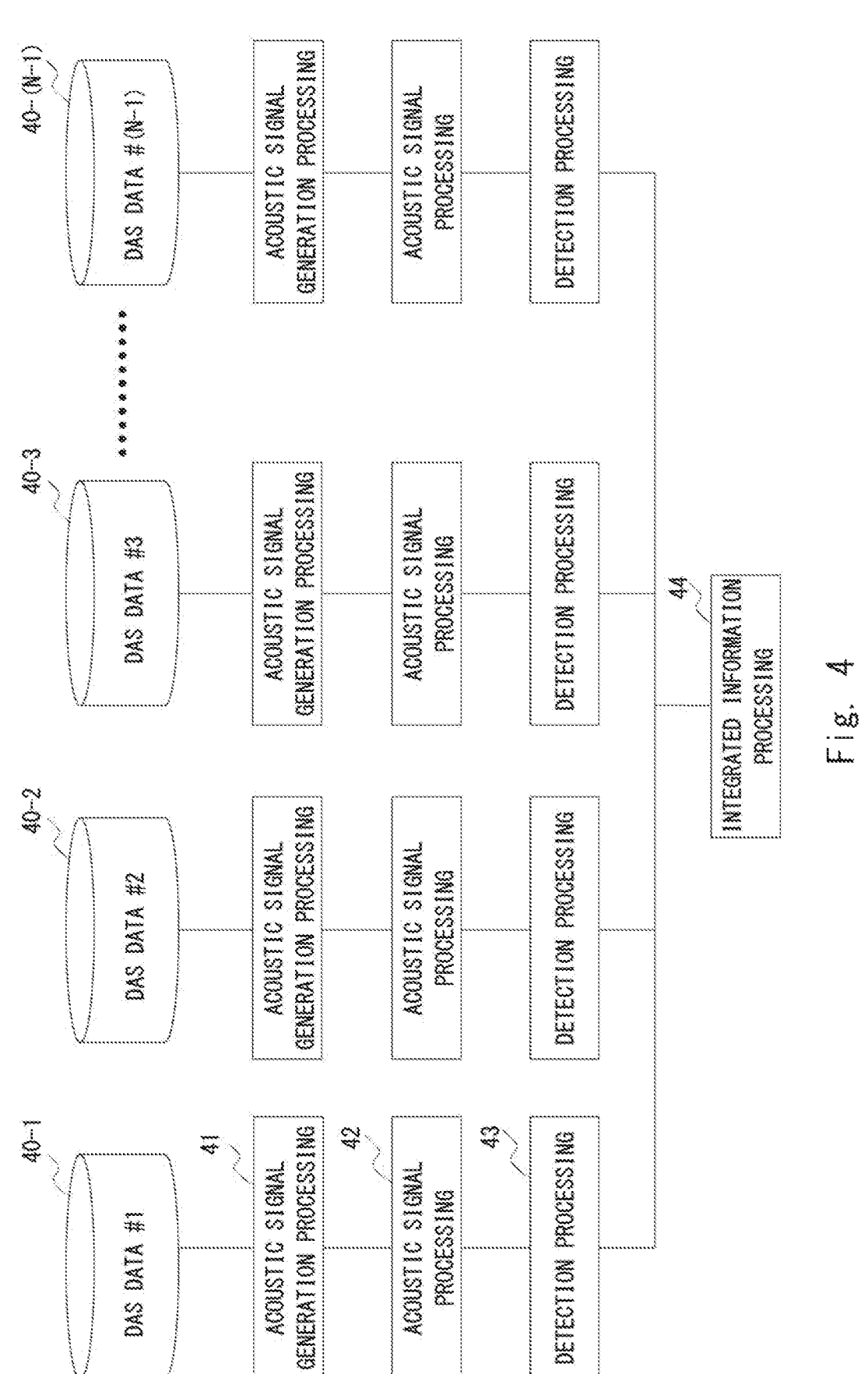
FIG. 4 is a diagram illustrating an example of signal processing and information processing executed by an information processing apparatus in a ground station according to the first example embodiment.

FIG. 4 is a diagram illustrating an example of signal processing and information processing executed by the information processing apparatus 31 in the ground station 30-1 or 30-2 according to the first example embodiment.

In FIG. 4, DAS data 40-1 to 40-(N−1) are DAS data temporarily stored in each of the DAS control and data processing apparatuses 24 in the optical amplification relaying apparatuses 20-1 to 20-(N−1). The DAS data 40-1 to 40-(N−1) are acquired by the information processing apparatus 31 via the network switch 34.

The information processing apparatus 31 performs acoustic signal generation processing 41, acoustic signal processing 42, and detection processing 43 on the DAS data 40-1.

The acoustic signal generation processing 41 is processing of generating an acoustic signal from the DAS data 40-1.

The acoustic signal processing 42 and the detection processing 43 are processing of detecting an object to be a target by performing a frequency analysis and pattern matching on the acoustic signal generated by the acoustic signal generation processing 41.

In addition, similarly, the information processing apparatus 31 performs the acoustic signal generation processing 41, the acoustic signal processing 42, and the detection processing 43 on the DAS data 40-2 to 40-(N−1).

Thereafter, the information processing apparatus 31 performs integrated information processing 44 that integrates detection processing results acquired by the detection processing 43 with respect to each of the DAS data 40-1 to 40-(N−1). Then, the information processing apparatus 31 outputs information related to a characteristic of a signal detected in the entire fiber sensing system and a location of the detected object.

FIG. 5 is a diagram illustrating an example of a setting screen for setting an acquisition section of DAS data displayed on the information processing apparatus 31 in the ground station 30-1 or 30-2 according to the first example embodiment.

In the first example embodiment, it is possible to select whether or not to acquire DAS data for each submarine cable 10 separated by the DAS interrogator 26 and the terminator 25. In the example in FIG. 5, the submarine cable 10 between the optical amplification relaying apparatuses 20-1 and 20-2, and the submarine cable 10 between the optical amplification relaying apparatuses 20-2 and 20-3 are set as the acquisition section of DAS data.

Figure 6:
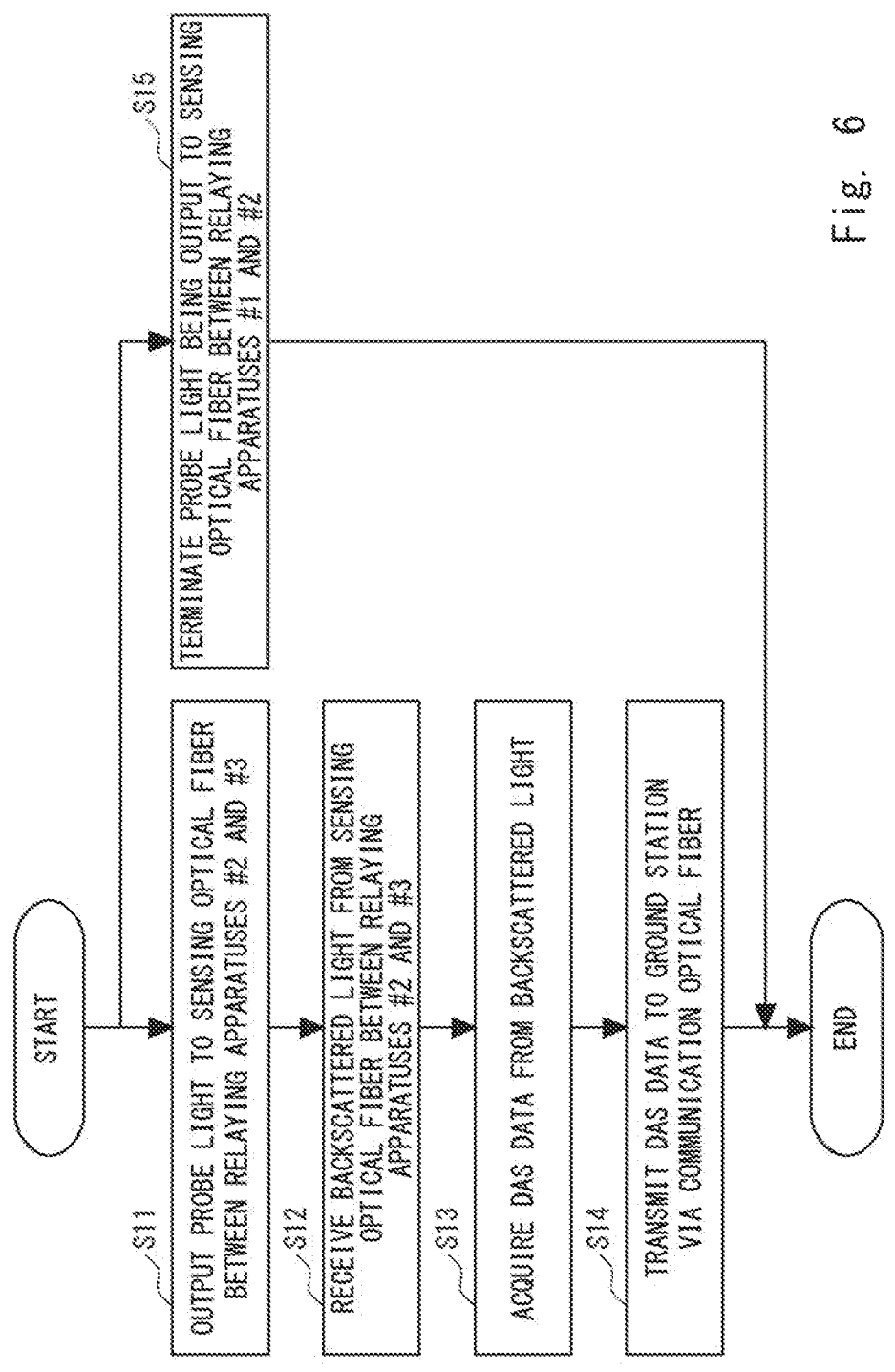
FIG. 6 is a flowchart illustrating an example of a flow of a schematic operation of the optical amplification relaying apparatus according to the first example embodiment.

FIG. 6 is a flowchart illustrating an example of a flow of a schematic operation of the optical amplification relaying apparatus 20 according to the first example embodiment. Note that, FIG. 6 illustrates an operation example of the optical amplification relaying apparatus 20-2 among the optical amplification relaying apparatuses 20-1 to 20-N that operate based on control information transmitted by the ground station 30-1. In addition, in FIG. 6, it is assumed that the control information transmitted by the ground station 30-1 notifies that the submarine cable 10 between the optical amplification relaying apparatuses 20-1 and 20-2 and the submarine cable 10 between the optical amplification relaying apparatuses 20-2 and 20-3 are set as an acquisition section of DAS data, and that the DAS data should be transmitted to the ground station 30-1.

Herein, the submarine cable 10 between the optical amplification relaying apparatuses 20-2 and 20-3 is an acquisition section of DAS data.

Thus, the DAS control and data processing apparatus 24 controls the DAS interrogator 26 in such a way as to acquire DAS data, by using the sensing optical fiber 14 in the submarine cable 10 between the optical amplification relaying apparatuses 20-2 and 20-3.

Specifically, the DAS interrogator 26 outputs probe light to the sensing optical fiber 14 under control by the DAS control and data processing apparatus 24 (step S11), receives backscattered light of the probe light from the sensing optical fiber 14 (step S12), and acquires, from the received backscattered light, DAS data representing vibration applied to the sensing optical fiber 14 (step S13).

The DAS control and data processing apparatus 24 temporarily stores the DAS data acquired by the DAS interrogator 26, and then transmits the stored DAS data to the ground station 30-1 from the network switch 23 via the communication optical fiber 13 (step S14).

Meanwhile, the submarine cable 10 between the optical amplification relaying apparatuses 20-1 and 20-2 is also an acquisition section of DAS data. Therefore, the DAS interrogator 26 in the optical amplification relaying apparatus 20-1 at the preceding stage outputs probe light to the sensing optical fiber 14 in the submarine cable 10 between the optical amplification relaying apparatuses 20-1 and 20-2.

Therefore, the terminator 25 terminates probe light being output from the DAS interrogator 26 in the optical amplification relaying apparatus 20-1 at the preceding stage to the sensing optical fiber 14 in such a way that the prove light is not reflected at the fiber end of the sensing optical fiber 14 (step S15).

As described above, according to the first example embodiment, each of the plurality of optical amplification relaying apparatuses 20 includes the terminator 25 and the DAS interrogator 26. The DAS interrogator 26 is connected to the terminator 25 in the optical amplification relaying apparatus 20 at the subsequent stage via the sensing optical fiber 14, and the terminator 25 is connected to the DAS interrogator 26 in the optical amplification relaying apparatus 20 at the preceding stage via the sensing optical fiber 14. The DAS interrogator 26 outputs probe light to the sensing optical fiber 14. The probe light is terminated by the terminator 25 in the optical amplification relaying apparatus 20 at the subsequent stage, and backscattered light of the probe light is received by the DAS interrogator 26. The DAS interrogator 26 acquires, from the received backscattered light, DAS data representing vibration applied to the sensing optical fiber 14.

In other words, according to the first example embodiment, the DAS interrogator 26 performs fiber sensing after the sensing optical fiber 14 is separated by the DAS interrogator 26 and the terminator 25. As a result, even when a cable length of the submarine cable 10 of the entire fiber sensing system is large, it is possible to acquire DAS data representing vibration in the high frequency band associated to an installation interval of the optical amplification relaying apparatus 20.

In addition, according to the first example embodiment, each of the plurality of optical amplification relaying apparatuses 20 includes the network switch 23 that transmits DAS data to the ground station 30 via the communication optical fiber 13. As a result, the DAS data acquired by the DAS interrogator 26 in the optical amplification relaying apparatus 20 can be transmitted to the ground station 30. In addition, the DAS data acquired by the DAS interrogator 26 in the plurality of optical amplification relaying apparatuses 20 can be aggregated in the ground station 30.

In addition, according to the first example embodiment, each of the plurality of optical amplification relaying apparatuses 20 includes the DAS control and data processing apparatus 24 that controls the DAS interrogator 26 and temporarily stores the DAS data acquired by the DAS interrogator 26. As a result, since it is not necessary to synchronize with the DAS interrogator 26 from the ground station 30, a highly redundant fiber sensing system can be constructed.

In addition, according to the first example embodiment, the DAS control and data processing apparatus 24 compresses DAS data as necessary, and the network switch 23 transmits the compressed DAS data via the communication optical fiber 13. As a result, even when the number of DAS interrogators 26 in the fiber sensing system increases, the DAS data can be transmitted without increasing the number of cores of the communication optical fiber 13.

In addition, according to the first example embodiment, the sensing optical fiber 14 is provided separately from the communication optical fiber 11. Therefore, as the sensing optical fiber 14, it is possible to use a fiber dedicated to fiber sensing in which sensitivity is increased by adding impurities.

In addition, according to the first example embodiment, as the sensing optical fiber 14, an optical fiber for optical communication similar to the communication optical fibers 11 and 13 can be used. In this case, the fiber sensing system can be constructed by utilizing an existing submarine cable for optical communication.

In addition, according to the first example embodiment, the ground station includes the information processing apparatus 31 that performs signal processing and information processing on the DAS data acquired by the DAS interrogator 26 in the plurality of optical amplification relaying apparatuses 20. In this way, processing with a high load is concentrated in the ground station 30. As a result, it is possible to reduce a size of the optical amplification relaying apparatus 20 being installed in the sea and having poor maintainability.

In addition, according to the first example embodiment, the information processing apparatus 31 can select whether or not to acquire DAS data for each submarine cable 10 separated by the DAS interrogator 26 and the terminator 25. As a result, for example, when a total length of a cable of the submarine cable 10 is large and a data amount of the DAS data presses communication by the communication optical fiber 13, it is possible to stop acquisition of the DAS data in any section. As a result, data loss due to network congestion can be prevented.

Second Example Embodiment

A second example embodiment is an example in which a fiber sensing system is used for underwater acoustic communication.

Figure 7:
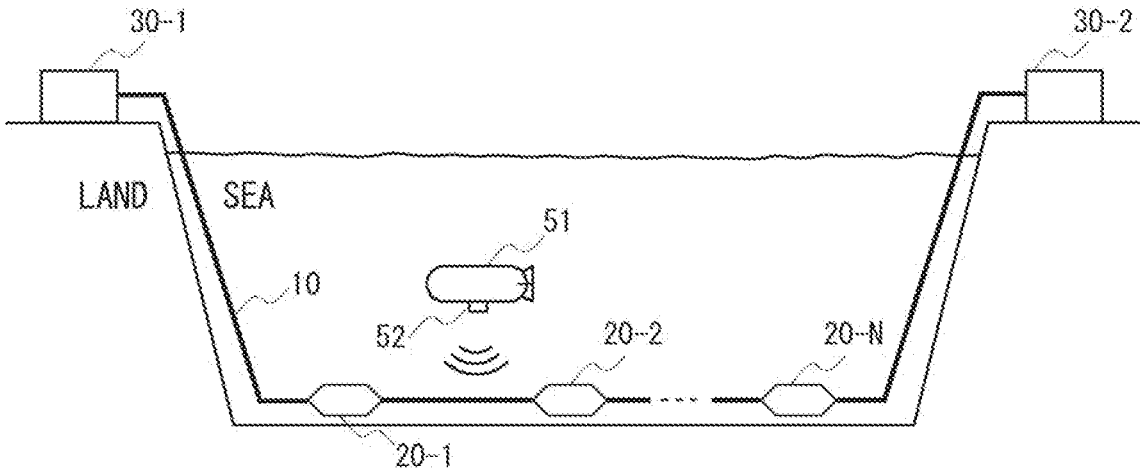
FIG. 7 is a diagram illustrating a configuration example of a fiber sensing system according to a second example embodiment.

FIG. 7 is a diagram illustrating a configuration example of a fiber sensing system according to the second example embodiment. Note that, the configuration itself of the fiber sensing system according to the second example embodiment is similar to that of the fiber sensing system according to the first example embodiment described above.

An underwater unmanned vehicle 51 is mounted with an underwater communication device 52, and transmits data in the underwater unmanned vehicle 51 using the underwater communication device 52.

The underwater communication device 52 is an apparatus that performs underwater acoustic communication using an acoustic signal as a carrier wave. The underwater acoustic communication is characterized in that a communication distance greatly changes depending on a situation of a temperature gradient in the sea.

A DAS interrogator 26 in an optical amplification relaying apparatus 20 acquires DAS data representing vibration applied to a sensing optical fiber 14 due to an acoustic signal transmitted as a carrier wave from the underwater unmanned vehicle 51. An information processing apparatus 31 in a ground station 30 performs signal processing and information processing on the DAS data, and thereby detects an acoustic signal transmitted from the underwater unmanned vehicle 51.

As described above, according to the second example embodiment, when an acoustic signal is transmitted from the underwater unmanned vehicle 51 in a vicinity of a submarine cable 10, the acoustic signal can be detected. Therefore, the underwater acoustic communication is characterized in that the communication distance greatly changes depending on a situation of the temperature gradient in the sea, but when the underwater unmanned vehicle 51 is located in the vicinity of the submarine cable 10, it is possible to perform underwater acoustic communication with the underwater unmanned vehicle 51.

Other advantageous effects are similar to those of the first example embodiment described above.

Third Example Embodiment

A third example embodiment is equivalent to an example embodiment in which the first and second example embodiments described above are put into a higher concept.

Figure 8:
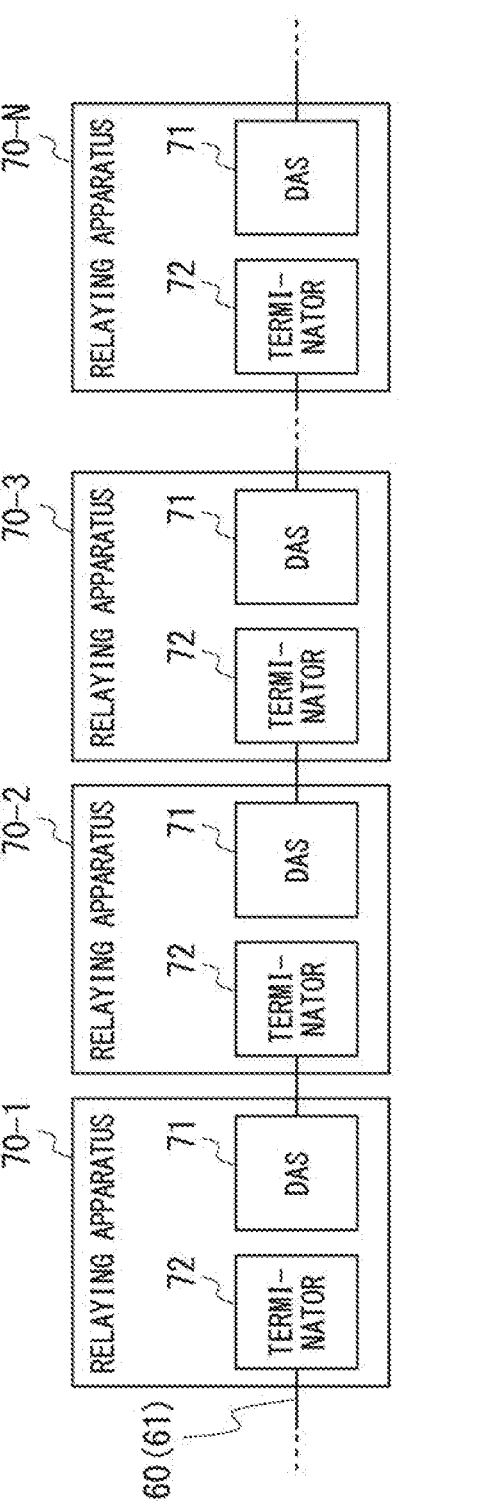
FIG. 8 is a diagram illustrating a configuration example of a fiber sensing system according to a third example embodiment.

FIG. 8 is a diagram illustrating a configuration example of a fiber sensing system according to the third example embodiment.

The fiber sensing system according to the third example embodiment includes a submarine cable 60, and a plurality of relaying apparatuses 70-1 to 70-N (N is a natural number equal to or greater than 2). Note that, in the following description, when it is not determined which of the relaying apparatuses 70-1 to 70-N is, it is simply referred to as a "relaying apparatus 70" as appropriate.

The submarine cable 60 and the relaying apparatuses 70-1 to 70-N are installed in the sea, more specifically, in the seabed.

The relaying apparatuses 70-1 to 70-N are connected in series to each other via the submarine cable 60. In addition, the relaying apparatuses 70-1 to 70-N are installed at a regular interval of the submarine cable 60.

The submarine cable 60 includes a sensing optical fiber 61.

Although a configuration of the relaying apparatus 70-2 will be described below, the other relaying apparatuses 70-1, and 70-3 to 70-N have a similar configuration to the relaying apparatus 70-2.

The relaying apparatus 70-2 includes a DAS interrogator 71, and a terminator 72.

The DAS interrogator 71 is connected to the sensing optical fiber 61 in the submarine cable 60. Specifically, the DAS interrogator 71 is connected to the relaying apparatus 70-3 (more specifically, the terminator 72 in the relaying apparatus 70-3) at a subsequent stage via the sensing optical fiber 61.

The terminator 72 is connected to the sensing optical fiber 61 in the submarine cable 60. Specifically, the terminator 72 is connected to the relaying apparatus 70-1 (more specifically, the DAS interrogator 71 in the relaying apparatus 70-1) at a preceding stage via the sensing optical fiber 61.

Herein, the DAS interrogator 71 outputs probe light to the sensing optical fiber 61 connected to the relaying apparatus 70-3 at the subsequent stage.

The terminator 72 terminates probe light being output from the DAS interrogator 71 in the relaying apparatus 70-1 at the preceding stage to the sensing optical fiber 61 connected to the relaying apparatus 70-1 at the preceding stage in such a way that the probe light is not reflected at an end portion of the sensing optical fiber 61.

The DAS interrogator 71 receives backscattered light of the probe light from the sensing optical fiber 61 connected to the relaying apparatus 70-3 at the subsequent stage, and acquires, from the received backscattered light, DAS data representing vibration applied to the sensing optical fiber 61 connected to the relaying apparatus 70-3 at the subsequent stage.

In other words, according to the third example embodiment, the DAS interrogator 71 performs fiber sensing after the sensing optical fiber 61 is separated by the DAS interrogator 71 and the terminator 72. As a result, even when a cable length of the submarine cable 60 of the entire fiber sensing system is large, it is possible to acquire DAS data representing vibration in the high frequency band associated to an installation interval of the relaying apparatuses 70-1 to 70-N.

Note that, the submarine cable 60 may further include a communication optical fiber. In addition, the relaying apparatus 70 may further include a network switch that is connected to the communication optical fiber and transmits DAS data to a predetermined destination via the communication optical fiber. The predetermined destination may be, for example, the ground station 30 according to the first and second example embodiments described above.

In addition, the relaying apparatus 70 may further include a controller that controls the DAS interrogator 71 in such a way as to acquire DAS data and temporarily stores the DAS data acquired by the DAS interrogator 71. In this case, the network switch may transmit the temporarily stored DAS data to the predetermined destination.

In addition, the sensing optical fiber 61 may be an optical fiber with increased sensitivity by adding impurities.

In addition, DAS data may be data representing vibration applied to the sensing optical fiber 61 due to an acoustic signal transmitted as a carrier wave from an underwater communication device mounted on an underwater unmanned vehicle.

Figure 9:
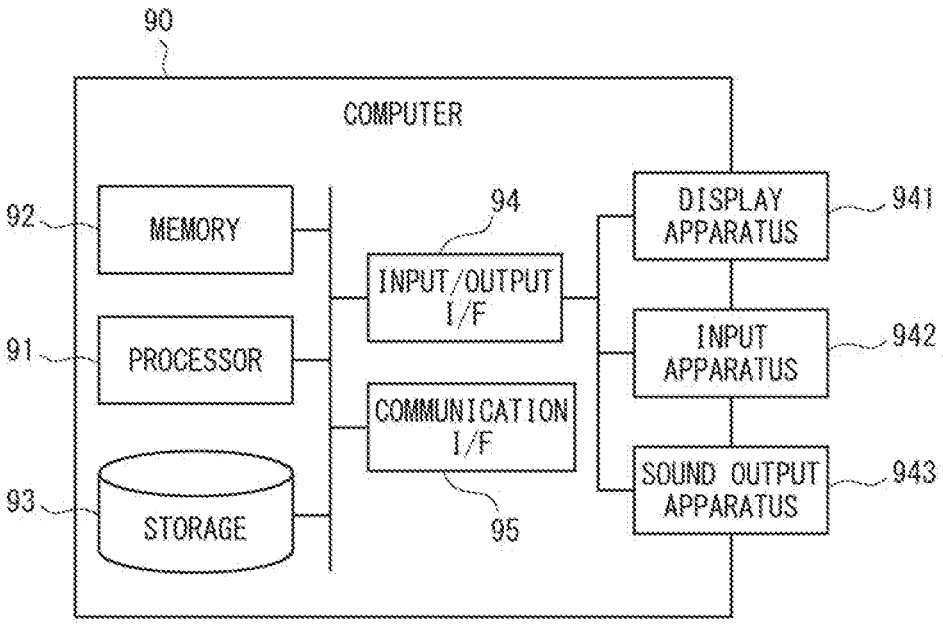
FIG. 9 is a block diagram illustrating a hardware configuration example of a computer that achieves the optical amplification relaying apparatus and a relaying apparatus according to the first to third example embodiments.

Hardware Configuration of Optical Amplification Relaying Apparatus and Relaying Apparatus According to Example Embodiment FIG. 9 is a block diagram illustrating a hardware configuration example of a computer 90 that achieves the optical amplification relaying apparatus 20 and the relaying apparatus 70 according to the first to third example embodiments described above.

The computer 90 includes a processor 91, a memory 92, a storage 93, an input/output interface (input/output I/F) 94, a communication interface (communication I/F) 95, and the like. The processor 91, the memory 92, the storage 93, the input/output interface 94, and the communication interface 95 are connected by a data transmission path for transmitting and receiving data to and from one another.

The processor 91 is, for example, an arithmetic processing apparatus such as a central processing unit (CPU) or a graphics processing unit (GPU). The memory 92 is, for example, a memory such as a random access memory (RAM) or a read only memory (ROM). The storage 93 is, for example, a storage apparatus such as a hard disk drive (HDD), a solid state drive (SSD), or a memory card. In addition, the storage 93 may be a memory such as a RAM or a ROM.

A program is stored in the storage 93. The program includes an instruction group (or a software code) for causing the computer 90 to perform one or more of functions of the optical amplification relaying apparatus 20 and the relaying apparatus 70 described above when the program is read into the computer 90. Components of the optical amplification relaying apparatus 20 and the relaying apparatus 70 described above may be achieved by the processor

91 reading and executing the program stored in the storage 93. In addition, the above-described storage function of the optical amplification relaying apparatus and the relaying apparatus 70 may be achieved by the memory 92 or the storage 93.

In addition, the above-described program can be stored and provided to the computer 90 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to the computer 90 using any type of transitory computer readable media. Examples of transitory computer readable media include electric signals, optical signals, and electromagnetic waves. Transitory computer readable media can provide the program to the computer 90 via a wired communication line (e.g., electric wires, and optical fibers) or a wireless communication line.

The input/output interface 94 is connected to a display apparatus 941, an input apparatus 942, a sound output apparatus 943, and the like. The display apparatus 941 is an apparatus, such as a liquid crystal display (LCD), a cathode ray tube (CRT) display, or a monitor, that displays a screen associated to drawing data processed by the processor 91. The input apparatus 942 is an apparatus that accepts an operation input from an operator, and is, for example, a keyboard, a mouse, a touch sensor, and the like. The display apparatus 941 and the input apparatus 942 may be integrated and achieved as a touch panel. The sound output apparatus 943 is an apparatus, such as a speaker, that outputs sound associated to acoustic data processed by the processor 91.

The communication interface 95 transmits and receives data to and from an external apparatus. For example, the communication interface 95 communicates with an external apparatus via a wired communication path or a wireless communication path.

Note that, in the above description, an example in which the optical amplification relaying apparatus 20 and the relaying apparatus 70 according to the above-described first to third example embodiments are achieved by the computer 90 illustrated in FIG. 9 has been described. However, the present disclosure is not limited thereto, and the ground station 30 according to the above-described first and second example embodiments may also be achieved by the computer 90 illustrated in FIG. 9.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

The first, second and third example embodiments can be combined as desirable by one of ordinary skill in the art.

The whole or part of the example embodiments disclosed above can be described as, but not limited to, the following supplementary notes.

(Supplementary Note 1)

A fiber sensing system including:

a submarine cable; and

13 a plurality of relaying apparatuses configured to be connected in series to one another via the submarine cable, wherein the submarine cable includes a sensing optical fiber, each of the plurality of relaying apparatuses includes a distributed acoustic sensing (DAS) interrogator configured to be connected to a relaying apparatus at a subsequent stage via the sensing optical fiber, and a terminator being connected to a relaying apparatus at a preceding stage via the sensing optical fiber, the DAS interrogator outputs probe light to the sensing optical fiber being connected to the relaying apparatus at the subsequent stage, the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

(Supplementary Note 2)

The fiber sensing system according to supplementary note 1, wherein the submarine cable further includes a communication optical fiber, and each of the plurality of relaying apparatuses further includes a network switch that is connected to the communication optical fiber and transmits the DAS data to a predetermined destination via the communication optical fiber.

(Supplementary Note 3)

The fiber sensing system according to supplementary note 2, wherein each of the plurality of relaying apparatuses further includes a controller that controls the DAS interrogator in such a way as to acquire the DAS data and temporarily stores the DAS data acquired by the DAS interrogator, and the network switch transmits the temporarily stored DAS data to the predetermined destination.

(Supplementary Note 4)

The fiber sensing system according to supplementary note 1, wherein the sensing optical fiber is an optical fiber with increased sensitivity by adding impurities.

(Supplementary Note 5)

The fiber sensing system according to supplementary note 1, wherein the DAS data are data representing vibration applied to the sensing optical fiber due to an acoustic signal transmitted as a carrier wave from an underwater communication device mounted on an underwater unmanned vehicle.

(Supplementary Note 6)

A relaying apparatus among a plurality of relaying apparatuses being connected in series to one another via a submarine cable, the relaying apparatus including:

a distributed acoustic sensing (DAS) interrogator configured to be connected to a relaying apparatus at a subsequent stage via a sensing optical fiber included in the submarine cable; and

a terminator configured to be connected to a relaying apparatus at a preceding stage via the sensing optical fiber, wherein the DAS interrogator outputs probe light to the sensing optical fiber being connected to the relaying apparatus at the subsequent stage, the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

(Supplementary Note 7)

The relaying apparatus according to supplementary note 6, further including a network switch configured to be connected to a communication optical fiber included in the submarine cable and transmit the DAS data to a predetermined destination via the communication optical fiber.

(Supplementary Note 8)

The relaying apparatus according to supplementary note 7, further including a controller configured to control the DAS interrogator in such a way as to acquire the DAS data and temporarily store the DAS data acquired by the DAS interrogator, wherein the network switch transmits the temporarily stored DAS data to the predetermined destination.

(Supplementary Note 9)

The relaying apparatus according to supplementary note 6, wherein the DAS data are data representing vibration applied to the sensing optical fiber due to an acoustic signal transmitted as a carrier wave from an underwater communication device mounted on an underwater unmanned vehicle.

(Supplementary Note 10)

A fiber sensing method being executed by one relaying apparatus of a plurality of relaying apparatuses being connected in series to one another via a submarine cable, wherein the relaying apparatus includes a distributed acoustic sensing (DAS) interrogator configured to be connected to a relaying apparatus at a subsequent stage via a sensing optical fiber included in the submarine cable, and a terminator configured to be connected to a relaying apparatus at a preceding stage via the sensing optical fiber, and the fiber sensing method including:

by the DAS interrogator, outputting probe light to the sensing optical fiber being connected to the relaying apparatus at the subsequent stage;

by the terminator, terminating probe light being output from the DAS interrogator in the relaying apparatus at the preceding stage to the sensing optical fiber being connected to the relaying apparatus at the preceding stage in such a way that the probe light is not reflected at an end portion of the sensing optical fiber; and by the DAS interrogator, receiving backscattered light of probe light from the sensing optical fiber being connected to the relaying apparatus at the subsequent stage, and acquiring, from the received backscattered light, DAS data representing vibration applied to the sensing optical fiber being connected to the relaying apparatus at the subsequent stage.

What is claimed is:

1. A fiber sensing system comprising:
a submarine cable; and
a plurality of relaying apparatuses configured to be connected in series to one another via the submarine cable, wherein
the submarine cable includes a sensing optical fiber,
each of the plurality of relaying apparatuses includes a distributed acoustic sensing (DAS) interrogator configured to be connected to a relaying apparatus at a subsequent stage via the sensing optical fiber, and
a terminator being connected to a corresponding relaying apparatus of the plurality of relaying apparatuses at a preceding stage via the sensing optical fiber,
the DAS interrogator outputs probe light to the sensing optical fiber being connected to the relaying apparatus at the subsequent stage,
the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and
the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

2. The fiber sensing system according to claim 1, wherein the submarine cable further includes a communication optical fiber, and each of the plurality of relaying apparatuses further includes a network switch that is connected to the communication optical fiber and transmits the DAS data to a predetermined destination via the communication optical fiber.

3. The fiber sensing system according to claim 2, wherein each of the plurality of relaying apparatuses further includes a controller that controls the DAS interrogator in such a way as to acquire the DAS data and temporarily stores the DAS data acquired by the DAS interrogator, and
the network switch transmits the temporarily stored DAS data to the predetermined destination.

4. The fiber sensing system according to claim 1, wherein the sensing optical fiber is an optical fiber with increased sensitivity by adding impurities.

5. The fiber sensing system according to claim 1, wherein the DAS data are data representing vibration applied to the sensing optical fiber due to an acoustic signal transmitted as a carrier wave from an underwater communication device mounted on an underwater unmanned vehicle.

6. A relaying apparatus among a plurality of relaying apparatuses being connected in series to one another via a submarine cable, the relaying apparatus comprising:
a distributed acoustic sensing (DAS) interrogator configured to be connected to a relaying apparatus at a subsequent stage via a sensing optical fiber included in the submarine cable; and
a terminator configured to be connected to a corresponding relaying apparatus of the plurality of relaying apparatuses at a preceding stage via the sensing optical fiber, wherein the DAS interrogator outputs probe light to the sensing optical fiber being connected to the relaying apparatus at the subsequent stage,
the terminator terminates probe light being output from the DAS interrogator in the relaying apparatus at the preceding stage to the sensing optical fiber being connected to the relaying apparatus at the preceding stage in such a way that the probe light is not reflected at an end portion of the sensing optical fiber, and
the DAS interrogator receives backscattered light of probe light from the sensing optical fiber being connected to the relaying apparatus at the subsequent stage, and acquires, from the received backscattered light, DAS data representing vibration applied to the sensing optical fiber being connected to the relaying apparatus at the subsequent stage.

7. The relaying apparatus according to claim 6, further comprising a network switch configured to be connected to a communication optical fiber included in the submarine cable and transmit the DAS data to a predetermined destination via the communication optical fiber.

8. The relaying apparatus according to claim 7, further comprising a controller configured to control the DAS interrogator in such a way as to acquire the DAS data and temporarily store the DAS data acquired by the DAS interrogator,
wherein the network switch transmits the temporarily stored DAS data to the predetermined destination.

9. The relaying apparatus according to claim 6, wherein the DAS data are data representing vibration applied to the sensing optical fiber due to an acoustic signal transmitted as a carrier wave from an underwater communication device mounted on an underwater unmanned vehicle.

10. A fiber sensing method being executed by one relaying apparatus of a plurality of relaying apparatuses being connected in series to one another via a submarine cable, wherein
the relaying apparatus includes
a distributed acoustic sensing (DAS) interrogator configured to be connected to a relaying apparatus at a subsequent stage via a sensing optical fiber included in the submarine cable, and
a terminator configured to be connected to a corresponding relaying apparatus of the plurality of relaying apparatuses at a preceding stage via the sensing optical fiber, and
the fiber sensing method comprising:
by the DAS interrogator, outputting probe light to the sensing optical fiber being connected to the relaying apparatus at the subsequent stage;
by the terminator, terminating probe light being output from the DAS interrogator in the relaying apparatus at the preceding stage to the sensing optical fiber being connected to the relaying apparatus at the preceding stage in such a way that the probe light is not reflected at an end portion of the sensing optical fiber; and
by the DAS interrogator, receiving backscattered light of probe light from the sensing optical fiber being connected to the relaying apparatus at the subsequent stage, and acquiring, from the received backscattered light, DAS data representing vibration applied to the sensing optical fiber being connected to the relaying apparatus at the subsequent stage.

* * * * *